United States Patent
Torri et al.

(10) Patent No.: US 10,612,914 B2
(45) Date of Patent: Apr. 7, 2020

(54) VEHICLE EQUIPMENT WITH SCANNING SYSTEM FOR CONTACTLESS MEASUREMENT

(71) Applicant: CEMB S.p.A., Mandello del Lario (Lecco) (IT)

(72) Inventors: Giancarlo Torri, Mandello del Lario (IT); Gabriele Corrain, Bentivoglio (IT)

(73) Assignee: CEMB S.P.A., Mandello del Lario (IT)

( * ) Notice: Subject to any disclaimer, the term of this patent is extended or adjusted under 35 U.S.C. 154(b) by 34 days.

(21) Appl. No.: 15/123,320

(22) PCT Filed: Mar. 20, 2015

(86) PCT No.: PCT/EP2015/055923
§ 371 (c)(1),
(2) Date: Sep. 2, 2016

(87) PCT Pub. No.: WO2016/020073
PCT Pub. Date: Feb. 11, 2016

(65) Prior Publication Data
US 2018/0038685 A1 Feb. 8, 2018

(30) Foreign Application Priority Data
Aug. 8, 2014 (IT) .............................. MI2014A1467

(51) Int. Cl.
*G01B 11/25* (2006.01)
*G01S 7/481* (2006.01)
(Continued)

(52) U.S. Cl.
CPC ...... *G01B 11/2518* (2013.01); *G01B 11/2513* (2013.01); *G01M 17/007* (2013.01);
(Continued)

(58) Field of Classification Search
CPC ............ G01B 11/2518; G01B 11/2513; G01B 11/007; G06T 7/521; G01M 17/007; G01S 7/4815; G01S 17/89
(Continued)

(56) References Cited

U.S. PATENT DOCUMENTS

2010/0303336 A1 * 12/2010 Abraham ........... G01B 11/2755
382/154
2013/0038881 A1 2/2013 Pesach et al.
(Continued)

FOREIGN PATENT DOCUMENTS

| EP | 2475956 A2 | 7/2012 |
|---|---|---|
| WO | 2013/127974 A1 | 9/2013 |
| WO | 2014/083485 A1 | 6/2014 |

OTHER PUBLICATIONS

International Search Report dated Jun. 9, 2015 issued in PCT International Application No. PCT/EP2015/055923.

*Primary Examiner* — On S Mung
(74) *Attorney, Agent, or Firm* — Troutman Sanders LLP

(57) ABSTRACT

A vehicle equipment comprises a scanning system for the contactless measurement of at least one projector arranged at least for the projection onto an object to be measured of a structured light with a pattern, at least one video camera arranged for the acquisition of the image of the object to be measured, and a processing unit for processing the acquired image for the three-dimensional reconstruction of the object to be measured, the projector comprising in turn at least one matrix of emitters integrated into a monolithic substrate.

11 Claims, 2 Drawing Sheets

(51) Int. Cl.
  *G01S 17/89* (2020.01)
  *G01S 17/46* (2006.01)
  *G06T 7/521* (2017.01)
  *G01M 17/007* (2006.01)
  *G06T 7/60* (2017.01)
  *H04N 5/247* (2006.01)

(52) U.S. Cl.
  CPC ............ *G01S 7/4815* (2013.01); *G01S 17/46* (2013.01); *G01S 17/89* (2013.01); *G06T 7/521* (2017.01); *G06T 7/60* (2013.01); *G06T 2207/10152* (2013.01); *G06T 2207/30248* (2013.01); *H04N 5/247* (2013.01)

(58) Field of Classification Search
  USPC ....................................................... 348/135
  See application file for complete search history.

(56) References Cited

U.S. PATENT DOCUMENTS

2013/0271574 A1    10/2013   Dorrance et al.
2014/0307057 A1*   10/2014   Kang ................... H04N 13/239
                                                        348/47
2015/0316368 A1*   11/2015   Moench ................ H01S 5/005
                                                        348/46

* cited by examiner

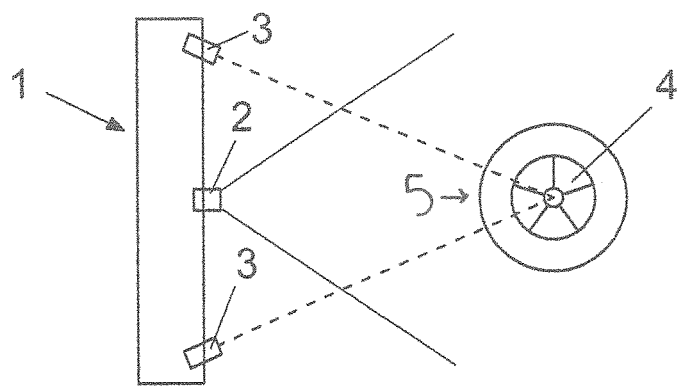
FIG. 1
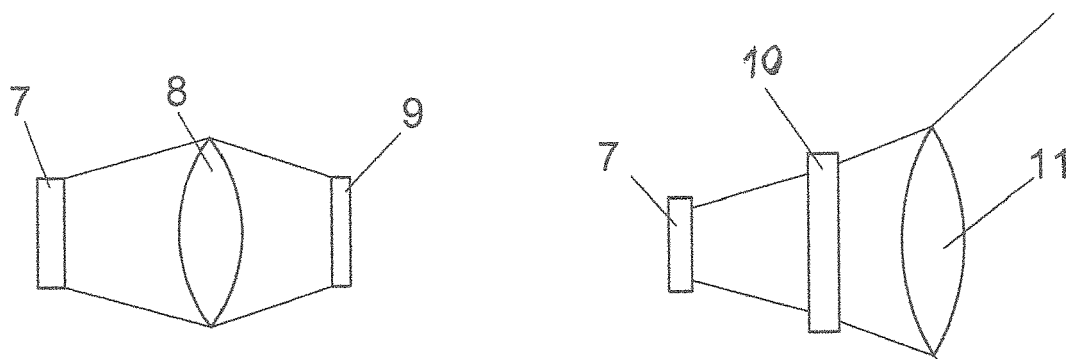
FIG. 2a
FIG. 2b
FIG. 2c
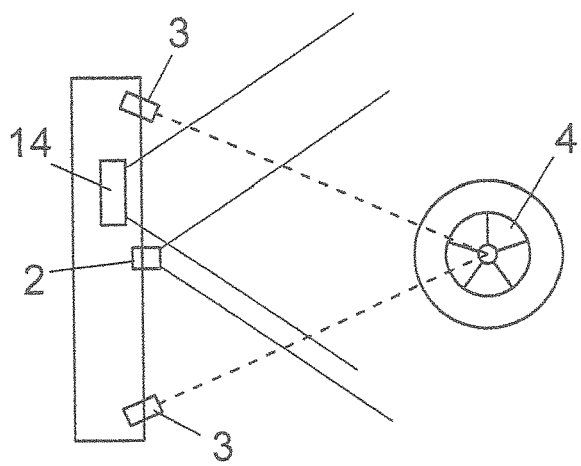
FIG. 3a
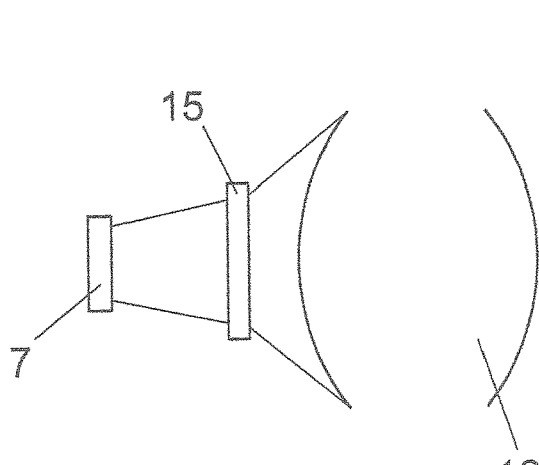
FIG. 3b

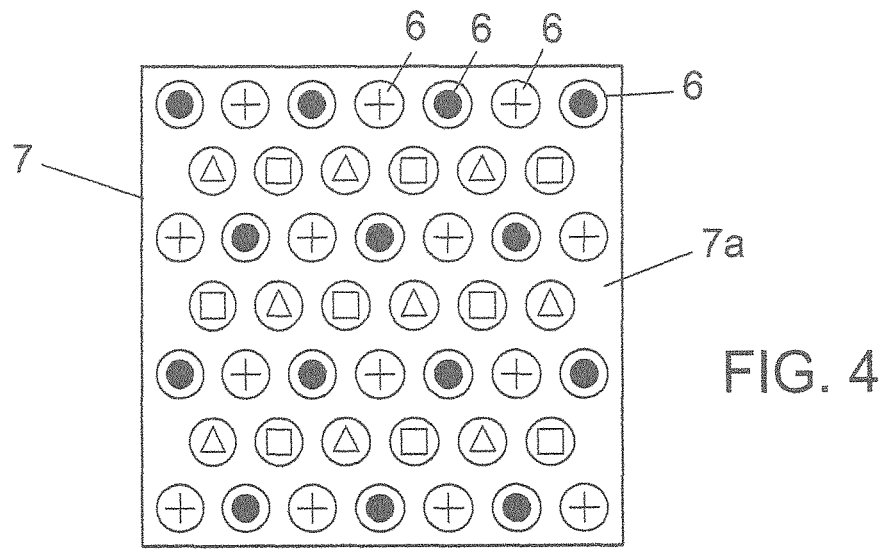
FIG. 4
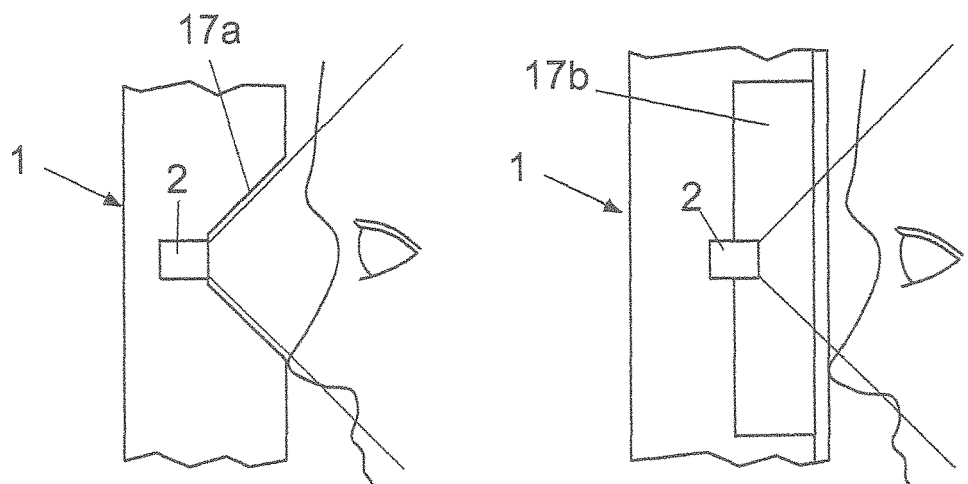
FIG. 5a
FIG. 5b
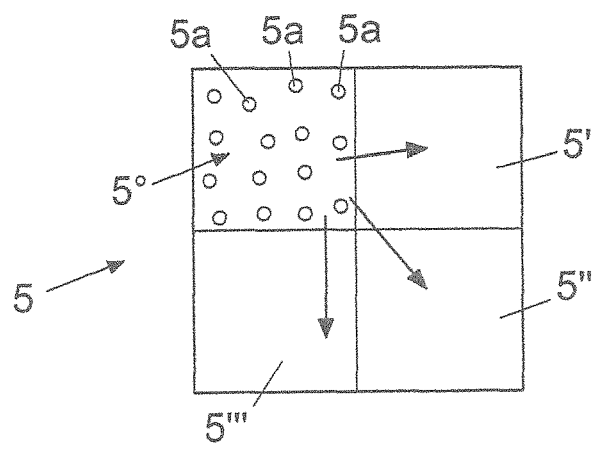
FIG. 6

VEHICLE EQUIPMENT WITH SCANNING SYSTEM FOR CONTACTLESS MEASUREMENT

CROSS-REFERENCE TO RELATED APPLICATIONS

This application is the U.S. National Phase of International Patent Application Serial No. PCT/EP2015/055923, filed on Mar. 20, 2015, which claims priority to Italian Patent Application No. MI2014A001467, filed on Aug. 8, 2014, both of which applications are herein incorporated by reference in their entirety.

FIELD OF THE INVENTION

The present invention relates to a vehicle equipment with a scanning system for contactless measurement.

BACKGROUND OF THE INVENTION

Vehicle equipment means devices adapted to take measurements or perform maintenance operations on vehicles or parts of ground vehicles, for example, wheel alignment, vehicle inspection, tyre removal, wheel balancing or engine diagnostic devices, lifts or a combination of these.

Contactless 3D structured light scanning systems are known in the vehicle equipment sector.

Such scanning systems, known for example in U.S. 2013271574, comprise a projector provided to project structured light onto a measurement object with a pattern, for example bright dots, one or more video cameras provided to arrange the pattern projected onto the measurement object, and a processing unit for the image acquired by the video cameras for the 3D reconstruction of the measurement object.

Such scanning systems are used for the 3D reconstruction of parts of vehicles, for example the wheels or parts of the bodywork, or mobile parts of other vehicle equipment, for example tyre removal arms or lifts, or parts of the operator's body, in order to recognise their controls.

3D scanning is performed by the processing unit by comparing the images with one another, acquired by the cameras, of the measurement object onto which the structured light is projected and potentially also comparing with said images the geometry of the pattern loaded a priori into the memory of the processing unit. In devices with only one camera, said comparison with the geometry of the pattern is necessary; in devices with more than one camera it is optional.

The projector preferably uses a laser source because, with respect to other sources such as LED or incandescent lamps, it is coherent and therefore allows diffractive optical elements (DOEs) to be exploited in order to create the pattern cheaply and efficiently, it has a narrow emission band and therefore allows narrow-band filters to be used for the video cameras improving the ambient light rejection, has a small emission area and therefore allows the optical power to be concentrated into small dots hence enabling the resolution of the pattern and therefore the 3D reconstruction to be increased.

The laser source normally consists of a lateral emission diode, which however objectively has a series of drawbacks.

In the first place, it has a high ratio between cost and ambient disturbance rejection. In fact, the rejection of ambient disturbances increases if the optical power increases and is distributed uniformly, but the cost increases with the optical power and with the same cost for increasing optical power the quality of the beam decreases and hence the uniformity of the optical power distribution. For this reason, in the vehicle equipment sector lateral emission diodes with limited optical power are currently used.

Secondly, it has a low maximum operating temperature and high sensitivity of the wavelength to temperature, making it necessary to connect the diode to a complex and costly thermoelectric cooler (TEC).

Thirdly, if it is used in combination with DOEs, it requires a complex and costly projection system for reducing the non-diffracted laser beam (zero order), potentially retro-activated, in order to verify correct operation, so as to fulfil safety requirements (see for example EP2475956).

Fourthly, it has reduced reliability for catastrophic failure, particularly in case of dust.

SUMMARY OF THE INVENTION

The technical task of the present invention is, therefore, to provide a vehicle equipment with a scanning system for contactless measurement which obviates the above-described technical drawbacks of the prior art.

Within the scope of s technical task, an object of the invention is to provide a vehicle equipment with a scanning system for contactless measurement which with reduced costs improves the accuracy of the 3D reconstruction of the measurement object.

The technical task, as well as these and other objects, according to the present invention, are reached by providing a vehicle equipment comprising a scanning system for the contactless measurement of at least one projector arranged at least for the projection onto an object to be measured of a structured light with a pattern, at least one video camera arranged for the acquisition of the image of the object to be measured, and a processing unit for processing the acquired image for the three-dimensional reconstruction of the object to be measured, characterised in that said projector comprises at least one matrix of emitters integrated into a monolithic substrate.

In a preferred embodiment of the invention the emitters are laser configured for the emission of radiation in direction orthogonal to their lying plane (VCSEL).

In a preferred embodiment of the invention said matrix of emitters comprises a matrix of laser diodes with emission of radiation parallel to their lying plane, cooperating with a reflector aligned with the laser diodes to redirect the emitted radiation in direction orthogonal to their lying plane.

In a preferred embodiment of the invention the overall optical power of the emitters is no less than 1 Watt.

In a preferred embodiment of the invention the intensity of the pattern according to the angle of projection (Watt/srad) increases with the angle of projection in the range of the null angle of projection.

In a preferred embodiment of the invention the maximum angle of projection of the projector is no less than 80°.

In a preferred embodiment of the invention at least two video cameras are provided.

In a preferred embodiment of the invention the projector comprises a protection configured to prevent the access of the human eye.

In a preferred embodiment of the invention uniform light generation means are provided comprising an independent projector from the structured light projector for the projection of uniform light and/or a diffuser arranged for the conversion of the structured light into a uniform light, activatable in programmatic mode.

In a preferred embodiment of the invention multiplication means are provided for multiplying the image or parts of the image of the matrix of emitters integrated into the monolithic substrate.

In a preferred embodiment of the invention the multiplication means comprise diffractive optical elements (DOEs) and/or matrices of microlenses and/or reflecting surfaces.

In a preferred embodiment of the invention movement means are provided for moving said projector.

In a preferred embodiment of the invention dissipation means are provided for dissipating the thermal power generated by said matrix of emitters.

In a preferred embodiment of the invention the vehicle equipment is used for measuring the characteristic dimensions and angles of wheels, steering and chassis of vehicles in a wheel alignment device.

BRIEF DESCRIPTION OF THE DRAWINGS

Further characteristics and advantages of the invention will more fully emerge from the description of a preferred but not exclusive embodiment of the vehicle equipment with a scanning system for contactless measurement according to the invention, illustrated by way of non-limiting example in the accompanying figures of the drawings, in which:

FIG. 1 shows a scanning system with two video cameras according to the invention;

FIG. 2a shows a first embodiment of the multiplication means;

FIG. 2b shows a second embodiment of the multiplication means;

FIG. 2c shows a third embodiment of the multiplication means;

FIG. 3a shows a first embodiment of the uniform light generation means;

FIG. 3b shows a second embodiment of the uniform light generation means;

FIG. 4 shows a front view of the matrix of emitters

FIG. 5a shows a first embodiment of the protection for the human eye;

FIG. 5b shows a second embodiment of the protection for the human eye; and

FIG. 6 shows four of the periodic replicas of the image of the matrix of emitters that are combined with other replicas of the image to form a pattern of bright dots generated thanks to the image multiplication means comprising for example a DOE.

DETAILED DESCRIPTION OF THE INVENTION

With reference to the mentioned figures, the vehicle equipment comprises a 3D scanning system 1 for contactless measurement equipped with a projector 2, two video cameras 3 and a processing unit (not shown).

The projector 2 is arranged for the protection onto an object 4 to be measured, in the example illustrated comprising for example a wheel, of a structured light with a pattern.

The pattern 5 may consist for example of dots, lines or 2D figures, distributed periodically or non-periodically. The example illustrated in FIG. 6 comprises a distributor of bright dots 5a, casual within a subset of the 5° projection area preferably comprising at least 16 dots, replicated periodically as portrayed for example by the replicas 5', 5", 5"', to tile the entire projection area.

The video cameras 3 are provided for the acquisition of the image of the object to be measured 4.

The processing unit for processing the acquired image is provided for the 3D reconstruction of the object to be measured 4.

Advantageously, in order to improve the accuracy of the 3D reconstruction of the object to be measured 4, the scanning system 1 envisages two video cameras 3, so that the geometry of the pattern does not need to be known a priori and therefore measurement inaccuracies due to the derivation of this geometry are avoided over time for example due to thermal, mechanical or optical causes.

The projector 2 comprises a matrix of microlaser emitters 6 produced with a semiconductor process on a monolithic substrate 7 particularly of GaAs wherein the distance between the individual microlasers is typically in the order of tens of μm and the wavelength is preferably comprised between 800 nm and 860 nm in order to exploit cheap sensors developed for the visible spectrum. A structure of this type is known in the sector by the acronym VCSEL (Vertical Cavity Surface Emitting Laser).

The matrix of emitters 6 preferably comprises no less than 500 emitters in an area of no less than 1 mm$^2$, and overall optical power of no less than 1 W, but which can reach over 10 W.

The matrix of emitters 6 thus configured is not susceptible to the risk of catastrophic failure and is practically insensitive to dust.

Furthermore the laser emitters 6 have a lower ratio between cost and optical power with respect to lateral emission diodes and can operate at a high operating temperature, typically up to 80° C. maintaining low sensitivity of the wavelength to temperature, typically 0.07 nm/° C., making a TEC unnecessary.

Advantageously to maximise the 3D reconstruction field the projector 2 has a maximum angle of projection of at least 80°.

Angle of projection means double the value of the theta angle formed by a ray of light with respect to the orthogonal direction to the lying plane of the emitters 6.

Advantageously, to obtain uniform irradiance of the pattern on the normal plane of the axis of projection, the optics of the projector 2 modulate the radiant intensity of the pattern (Watt/srad) with a pattern known as "batwing" ($1/\cos^2(\text{theta})$), i.e. increasing around the null angle of projection.

Advantageously, to reduce the systematic measurement error that occurs in the event of a static pattern, the scanning system 1 repeats the measurements changing the projected pattern 5 every time and finally mediating the results.

The pattern 5 can be varied using a mechanical movement system of the projector in the interval between two displays of the video cameras 3.

The number of dots of the pattern necessary for a sufficient density of dots on the object for its detailed reconstruction may be very high (over 10,000) with respect to the number of emitters that can be provided on a monolithic substrate in an economically acceptable way for the application.

Therefore, advantageously, in order to generate a pattern with a high number of dots without jeopardising the cost of the projector, the scanning system 1 envisages multiplication means for multiplying the image or parts of the image of the matrix of emitters 6, said means for example comprising DOEs and/or matrices of microlenses and/or reflecting surfaces.

With reference to FIG. 2a the multiplication means comprise, by way of example, a lens 8 interposed between the substrate 7 and a DOE 9: the lens 8 creates the image of the emitters 6 on a projection plane and the DOE 9 multiplies it by tiling the projection plane with replicas of such an image.

With reference to FIG. 2b the multiplication means comprise, by way of example, a matrix of microlenses 10 interposed between the substrate 7 and a lens 11: each microlens 10 creates images of the active emitters 6 facing it and the lens 11 creates the image of such images on the projection plane.

With reference to FIG. 2c the multiplication means comprise, by way of example, mirrors 12, in particular prisms or hollow tubes with mirrored walls, and a lens 13: the radiation emitted by the active emitters 6 is reflected by the mirrors 12 creating a kaleidoscopic effect and the lens 13 focuses the resulting image on the projection plane.

Advantageously, to allow the processing unit to recognise high contrast edges of the object, for example between the rim and tyre of a wheel, for processing to support 3D reconstruction, for example, for recognising the measurement object, the scanning system 1 has uniform light generation means.

The uniform light generation means, as illustrated in FIG. 3a, may comprise a projector 14 that is independent from the structured light projector 2 for projecting uniform light.

Alternatively, the uniform light generation means, as illustrated in FIG. 3b, may comprise an optical element 15 characterised by behaviour that is programmed to switch from transmissive to diffusive mode (switchable diffuser), so as to allow the projection of structured light when switched to transmissive mode or uniform light when switched to diffusive mode.

Alternatively, the uniform light generation means, as illustrated in FIG. 3c, may include a variable focal lens in programmatic mode, so as to allow the projection of structured light when the pattern is focused onto the projection plane or uniform light when it is defocused.

Alternatively, the uniform light generation means may comprise means for moving the projector during the acquisition time of the video cameras.

Since the overall optical power of the matrix of emitters 6 as mentioned can reach high values, even over 10 W, advantageously a protection 17a, 17b is provided, configured to prevent the access of the human eye to areas in the vicinity of the projector 2 potentially at risk of exposure to radiation, for example, by means of a funnel-shaped recess 17a of FIG. 5a or a window 17b of FIG. 5b, so as to be classified in the low radiation exposure risk class.

It must however be noted that, although the overall optical power of the matrix of emitters 6 can assume high values, the individual emitters 6 are low power and therefore, when they are used in combination with DOEs, systems for reducing the power of the non-diffracted light beam (zero order) are not required.

Considering the reference values indicated above for the overall optical power generated by the matrix of emitters 6, which are ideal in the specific application field of vehicle equipment, it is also possible to provide specific dissipation means for dissipating the thermal power generated by the matrix of emitters 6 in its normal operation.

The vehicle equipment comprising a scanning system for contactless measurement as conceived herein is susceptible to many modifications and variations, all falling within the scope of the invented concept; furthermore, all the details are replaceable by technically equivalent elements.

For instance, the matrix of emitters in a possible embodiment of the invention comprises or consists of a matrix of laser diodes with emission of radiation parallel to their lying plane, cooperating with a reflector aligned with the laser diodes to redirect the emitted radiation in direction orthogonal to their lying plane.

The invention claimed is:

1. A vehicle equipment measuring the characteristic dimensions and/or angles of wheels, steering and chassis of vehicles in a wheel alignment device, comprising:
   a scanning system for contactless measurement equipped with at least two video cameras and at least one projector, the at least one projector arranged at least for the projection onto an object to be measured of a structured light with a pattern, and includes at least one matrix of emitters integrated into a monolithic substrate and a device changing the projected patterns, and
   wherein the at least two video cameras are arranged for the acquisition of at least two images of the object showing that the pattern is projected onto the object, and
   a processing unit configured to compute a plurality of three-dimensional reconstructions of the object to be measured, each of said three-dimensional reconstructions of the plurality of three-dimensional reconstructions is computed without a prior knowledge of the geometry of said pattern, from at least two images of the object showing that the pattern is projected onto the object, the pattern being changed between at least two three-dimensional reconstructions of the plurality of three-dimensional reconstructions, said processing unit further configured to compute a plurality of measurements of the object from the plurality of three-dimensional reconstructions and to mediate the measurements of the plurality of three-dimensional reconstructions to obtain a mediate measure of the object.

2. The vehicle equipment according to claim 1, wherein said emitters are laser configured for the emission of radiation in the orthogonal direction to their lying plane.

3. The vehicle equipment according to claim 1, wherein the overall optical power of the emitters is no less than 1 Watt.

4. The vehicle equipment according to claim 1, wherein a radiant intensity of the pattern according to an angle of projection (Watt/srad) increases with the angle of projection in the range of the null angle of projection.

5. The vehicle equipment according to claim 1, wherein a maximum angle of projection of said projector is no less than 80°.

6. The vehicle equipment according to claim 1, wherein said projector further comprises a protection device configured to prevent access of the human eye to the projector.

7. The vehicle equipment according to claim 1, comprising uniform light generator comprising an independent projector from the structured light projector projecting uniform light and a diffuser arranged for the conversion of the structured light into a uniform light, activatable in programmatic mode.

8. The vehicle equipment according to claim 1, comprising a multiplier multiplying the image or parts of the image of the matrix of emitters integrated into the monolithic substrate.

9. The vehicle equipment according to claim 8, wherein said multiplier comprises diffractive optical elements and matrices of microlenses, and reflecting surfaces.

10. The vehicle equipment according to claims 1, comprising for a dissipater dissipating the thermal power generated by said matrix of emitters.

11. The vehicle equipment according to claim 10, wherein said matrix of emitters is a matrix of laser diodes with emission of radiation parallel to an emitting plane, cooperating with a reflector aligned with the laser diodes to redirect the emitted radiation in the orthogonal direction to their lying plane.

\* \* \* \* \*